(12) United States Patent
Zhang et al.

(10) Patent No.: US 11,137,245 B2
(45) Date of Patent: Oct. 5, 2021

(54) RAMAN SPECTROSCOPY METHOD FOR SIMULTANEOUSLY MEASURING TEMPERATURE AND THERMAL STRESS OF TWO-DIMENSIONAL FILM MATERIAL IN SITU

(71) Applicant: Tsinghua University, Beijing (CN)

(72) Inventors: Xing Zhang, Beijing (CN); Haidong Wang, Beijing (CN); Hexin Liu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 42 days.

(21) Appl. No.: 16/877,770

(22) Filed: May 19, 2020

(65) Prior Publication Data

US 2021/0108911 A1    Apr. 15, 2021

(30) Foreign Application Priority Data

Oct. 9, 2019 (CN) .......................... 201910953760.7

(51) Int. Cl.
*G01B 11/16* (2006.01)
*G01N 21/65* (2006.01)
*G01K 11/00* (2006.01)

(52) U.S. Cl.
CPC .............. *G01B 11/16* (2013.01); *G01K 11/00* (2013.01); *G01N 21/65* (2013.01)

(58) Field of Classification Search
CPC G01J 3/44; G01N 21/65; G01K 11/00; G01B 11/16
See application file for complete search history.

(56) References Cited

U.S. PATENT DOCUMENTS

2016/0018334 A1*  1/2016  Tomar ................... G01K 13/00
                                                           356/301

FOREIGN PATENT DOCUMENTS

| CN | 103674084 | 3/2014 |
| CN | 106018377 | 10/2016 |

OTHER PUBLICATIONS

Wenqiang Zhao, "In-situ two-step Raman thermometry for thermal characterization of monolayer graphene interface material" Nov. 9, 2016 (Year: 2016).*

(Continued)

*Primary Examiner* — Maurice C Smith
(74) *Attorney, Agent, or Firm* — Hodgson Russ LLP

(57) ABSTRACT

Provided is a Raman spectroscopy method for simultaneously measuring a temperature and a thermal stress of a two-dimensional film material in situ. The method includes: providing the two-dimensional film material including a suspended part and a supported part and measuring Raman signals of the suspended part and the supported part; establishing equations of a Raman shift with temperature and a Raman shift with thermal stress for each of the suspended part and the supported part, and solving simultaneous equations to obtain coefficients with temperature and thermal stress; and scanning a characteristic Raman spectrum field of the two-dimensional film material and obtaining a temperature distribution and a thermal stress distribution of the two-dimensional film material according to the characteristic Raman spectrum field in combination of the coefficients of the Raman shift with temperature and the Raman shift with thermal stress.

18 Claims, 4 Drawing Sheets

(56) References Cited

OTHER PUBLICATIONS

Mark R. Abel, "Thermal Metrology of Silicon Microstructures Using Raman Spectroscopy", Jun. 2007 (Year: 2007).*
Kiyoshi Hirao, "Evaluation of Residual Thermal Stress in Cu Metalized Silicon Nitride Substrates by Raman Spectroscopy", 2018 (Year: 2018).*
Thomas Beechem, "Simultaneous mapping of temperature and stress in microdevices using micro-Raman spectroscopy", 2007 (Year: 2007).*
SIPO, First OA for CN application 201910953760.7, May 28, 2020.

* cited by examiner providing the two-dimensional film material comprising a suspended part and a supported part having stress states different from each other, and measuring Raman spectroscopy signals of the suspended part and the supported part of the two-dimensional film material

↓ establishing equations of a Raman shift with temperature and a Raman shift with thermal stress for each of the suspended part and the supported part, and solving simultaneous equations to obtain coefficients of the Raman shift with temperature and the Raman shift with thermal stress for each of the suspended part and the supported part

↓ scanning a characteristic Raman spectroscopy field of a surface of the two-dimensional film material and obtaining a temperature distribution and a thermal stress distribution of the two-dimensional film material according to the characteristic Raman spectroscopy field in combination of the coefficients of the Raman shift with temperature and the Raman shift with thermal stress

Fig. 1

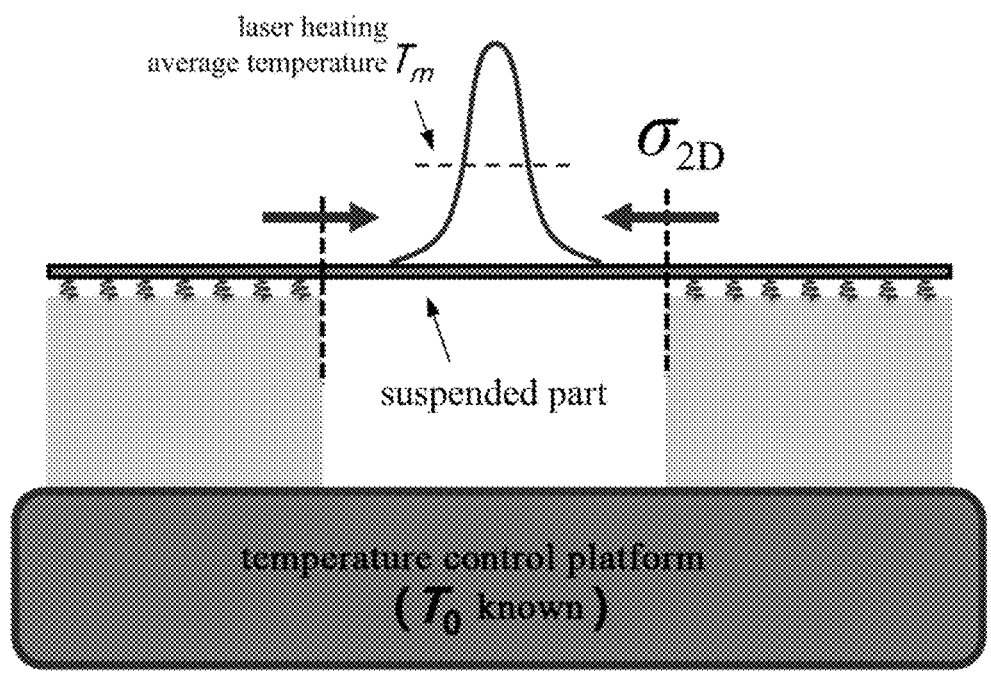

Fig. 2

RAMAN SPECTROSCOPY METHOD FOR SIMULTANEOUSLY MEASURING TEMPERATURE AND THERMAL STRESS OF TWO-DIMENSIONAL FILM MATERIAL IN SITU

CROSS-REFERENCE TO RELATED APPLICATION

This application claims priority to and benefits of Chinese Patent Application Serial No. 201910953760.7, filed with the National Intellectual Property Office Administration of P. R. China on Oct. 9, 2019, the entire contents of which is incorporated herein by reference.

TECHNICAL FIELD

The present disclosure relates to a field of testing thermal and mechanical performances of a nano-material, and particular to a Raman spectroscopy method for simultaneously measuring a temperature and a thermal stress of a two-dimensional film material in situ.

BACKGROUND

At present, methods for measuring temperature and stress of a nano-material can be classified into two types, i.e., contact methods and non-contact methods. In the related art, temperature and thermal stress of a nano-material are measured separately. Raman spectroscopy is reported as a non-contact method that can measure both the temperature and the stress. However, Raman shift of characteristic peaks is related to the both, the temperature and the stress are coupled to each other to affect the Raman shift and there is no method reported so far that can effectively decouple influences caused by the temperature and the stress on the shift of Raman spectrum. On this basis, the temperature or the stress of a material is still measured in a single-value change manner.

SUMMARY

The present disclosure seeks to solve at least one of the problems that exist in the related art to at least some extent. Accordingly, an object of the present disclosure is to provide a Raman spectroscopy method for simultaneously measuring a temperature and a thermal stress of a two-dimensional film material in situ.

In an aspect, the present disclosure provides in embodiments a Raman spectroscopy method for simultaneously measuring a temperature and a thermal stress of a two-dimensional film material in situ, including: (1) providing the two-dimensional film material including a suspended part and a supported part having stress states different from each other, and measuring Raman spectroscopy signals of the suspended part and the supported part of the two-dimensional film material; (2) establishing equations of a Raman shift with temperature and a Raman shift with thermal stress for each of the suspended part and the supported part, and solving simultaneous equations to obtain coefficients of the Raman shift with temperature and the Raman shift with thermal stress for each of the suspended part and the supported part; and (3) scanning a characteristic Raman spectrum field of a surface of the two-dimensional film material and obtaining a temperature distribution and a thermal stress distribution of the two-dimensional film material according to the characteristic Raman spectrum field in combination of the coefficients of the Raman shift with temperature and the Raman shift with thermal stress.

In an embodiment of the present disclosure, the two-dimensional film material is a non-metallic material having a Raman characteristic peak.

In an embodiment of the present disclosure, the two-dimensional film material has a thickness of no more than 1 µm.

In an embodiment of the present disclosure, the two-dimensional film material is a two-dimensional nano-material.

In an embodiment of the present disclosure, the step (1) further includes: (1-1) placing the two-dimensional film material onto a thermally conductive substrate with a plurality of holes to form the suspended part and the supported part; (1-2) placing the thermally conductive substrate carried with the two-dimensional film material onto a temperature control platform, and controlling temperatures of the thermally conductive substrate and the two-dimensional film material by changing a temperature of the temperature control platform; (1-3) maintaining temperatures of the thermally conductive substrate and the two-dimensional film material unchanged via the temperature control platform, focusing a first laser beam on a surface of the suspended part, and measuring a characteristic Raman spectrum of the suspended part and recording a shift of a characteristic Raman spectrum including Stoke and anti-Stoke peaks at each of different laser intensities; (1-4) establishing a temperature rise equation of the two-dimensional film material according to frequencies of the Stoke and anti-Stoke peaks obtained in step (1-3), and calculating a temperature rise of the two-dimensional film material generated at each of the different laser intensities; (1-5) focusing a second laser beam on a surface of the supported part of the two-dimensional film material and controlling a temperature rise, generated by a laser, of the two-dimensional film material to be not greater than 5 K, increasing the temperature of the thermally conductive substrate via the temperature control platform so as to control the temperature rise of the two-dimensional film material to be consistent with the temperature rise calculated in step (1-4), and measuring and recording a shift of a characteristic Raman spectrum of the two-dimensional film material at each of different temperatures of the thermally conductive substrate.

In an embodiment of the present disclosure, in the step (1-4), after the two-dimensional film material is heated by the laser, the two-dimensional film material meets the following temperature equation:

$$\frac{I_{AS}}{I_S} = \frac{(\omega_1 + \omega_v)^4}{(\omega_1 - \omega_v)^4} \exp\left(-\frac{\hbar\omega_v}{k_B T_m}\right)$$

where $I_S$ represents an amplitude of the Stoke peak of the two-dimensional film material and $I_{AS}$ represents an amplitude of the anti-Stoke peak of the two-dimensional film material, $\omega_1$ represents a laser frequency, $\omega_v$ represents a frequency of a characteristic Raman peak, h represents the Planck constant, $k_B$ represents the Boltzmann constant, and $T_m$ represents an average temperature of the two-dimensional film material.

In an embodiment of the present disclosure, the step (2) further includes:

establishing the following equation of the Raman shift of the suspended part obtained from the step (1-3):

$$\Delta\omega_{sus} = A_T \Delta T_m - A_S \sigma_{2D}$$

establishing the following equation of the Raman shift of the supported part obtained from the step (1-5):

$$\Delta\omega_{sup}=A_T\Delta T_m-A_S\sigma_{2D}+A_S\int_{T_0}^{T_m}(E_{sub}\alpha_{sub}-E_{2D}\alpha_{2D})dT$$

where $\Delta\omega_{sus}$ represents a shift of a characteristic Raman spectrum of the suspended part, and $\Delta\omega_{sup}$ represents a shift of a characteristic Raman spectrum of the supported part;

$A_T$ represents a shift coefficient with temperature, and $A_S$ represents a shift coefficient with thermal stress;

$\sigma_{2D}$ represents a thermal stress of the two-dimensional film material;

$\alpha_{sub}$ represents a thermal expansion coefficient of the thermally conductive substrate, and $\alpha_{2D}$ represents a thermal expansion coefficient of the two-dimensional film material;

$E_{sub}$ represents an elastic modulus of the thermally conductive substrate, and $E_{2D}$ represents an elastic modulus of the two-dimensional film material; and $T_0$ represents a temperature of the thermally conductive substrate, $T_m$ represents an average temperature of the two-dimensional film material, and $\Delta T_m$ represents an average temperature rise of the two-dimensional film material.

In an embodiment of the present disclosure, the shift coefficient with thermal stress of the two-dimensional film material is calculated as $$A_S=\frac{\Delta\omega_{sup}-\Delta\omega_{sus}}{\sigma_{sub}-\sigma_{2D}},$$

the shift coefficient with temperature of the two-dimensional film material is calculated as $$A_T=\frac{\Delta\omega_{sus}\sigma_{sub}+\Delta\omega_{sup}\sigma_{2D}-2\Delta\omega_{sus}\sigma_{2D}}{\Delta T_m(\sigma_{sub}-\sigma_{2D})},$$

the thermal stress of the two-dimensional film material is calculated as $\sigma_{2D}=E_{2D}\alpha_{2D}\Delta T_m$, and the thermal stress of the thermally conductive substrate is calculated as $\sigma_{sub}=E_{sub}\alpha_{sub}\Delta T_m$.

In an embodiment of the present disclosure, the step (3) further includes: (3-1) controlling a focus position of a laser beam or a position of the two-dimensional film material, scanning every point in a two-dimensional plane of the two-dimensional film material, and recording every shift of the characteristic Raman spectrum of the two-dimensional film material including the suspended part and the supported part; (3-2) establishing temperature rise and thermal stress equations of the suspended part and the supported part according to the shift coefficient with thermal stress and the shift coefficient with temperature; and (3-3) calculating temperature field and thermal stress field distributions of the suspended part and the supported part of the two-dimensional film material according to the shifts of the characteristic Raman spectrum of every point in the two-dimensional plane of the two-dimensional film material and the equations established in the step (3-2).

In an embodiment of the present disclosure, in the step (3-2), the suspended part has the following temperature rise equation of $$\Delta T_m=\Delta\omega_{sus}/(A_T-A_SE_{2D}\alpha_{2D}), \text{ and}$$

the following thermal stress equation of $$\sigma_{2D}=E_{2D}\alpha_{2D}\Delta T_m,$$

and the supported part has the following temperature rise equation of $$\Delta T_m=(\Delta\omega_{sup}-A_S\sigma_{sub})/(A_T-2A_SE_{2D}\alpha_{2D}), \text{ and}$$

the following thermal stress equation of $$\sigma_{2D}=E_{2D}\alpha_{2D}\Delta T_m.$$

In an embodiment of the present disclosure, in the step (1-1), the two-dimensional film material is a two-dimensional nano-material coated with a supporting film, and the two-dimensional nano-material is transferred onto the thermally conductive substrate with the plurality of holes by the supporting film.

In an embodiment of the present disclosure, in the step (1-1), the thermally conductive substrate is at least one of a silicon substrate, a silicon dioxide substrate and a silicon carbide substrate.

In an embodiment of the present disclosure, the first laser beam and the second laser beam are independently a monochromatic, stable, continuous laser beam.

In an embodiment of the present disclosure, the second laser beam focused on the surface of the supported part has an intensity of no greater than 3 mW.

In an embodiment of the present disclosure, a ratio of a diameter of a spot formed on the surface of the two-dimensional film material by a laser beam to a diameter of a hole of the thermally conductive substrate is in a range of 3 to 10.

In an embodiment of the present disclosure, the ratio of the diameter of the spot formed on the surface of the two-dimensional film material to the diameter of the hole of the thermally conductive substrate is in a range of 4 to 6.

In another aspect, the present disclosure provides in embodiments a device for simultaneously measuring a temperature and a thermal stress of a two-dimensional film material in situ, including: a processor; and a memory for storing instructions executable by the processor. The processor is configured to perform the Raman spectroscopy method as described above.

In a further aspect, the present disclosure provides in embodiments a non-transitory computer readable storage medium having stored therein a computer program that, when executed by a processor, causes the processor to perform the Raman spectroscopy method as described above.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the drawings, in which:

FIG. 1 is a flow chart of a Raman spectroscopy method for simultaneously measuring a temperature and a thermal stress of a two-dimensional film material in situ according to an embodiment of the present disclosure;

FIG. 2 is a schematic diagram showing a suspended part of a two-dimensional film material heated by a laser according to an embodiment of the present disclosure;

DETAILED DESCRIPTION

Figure 3:
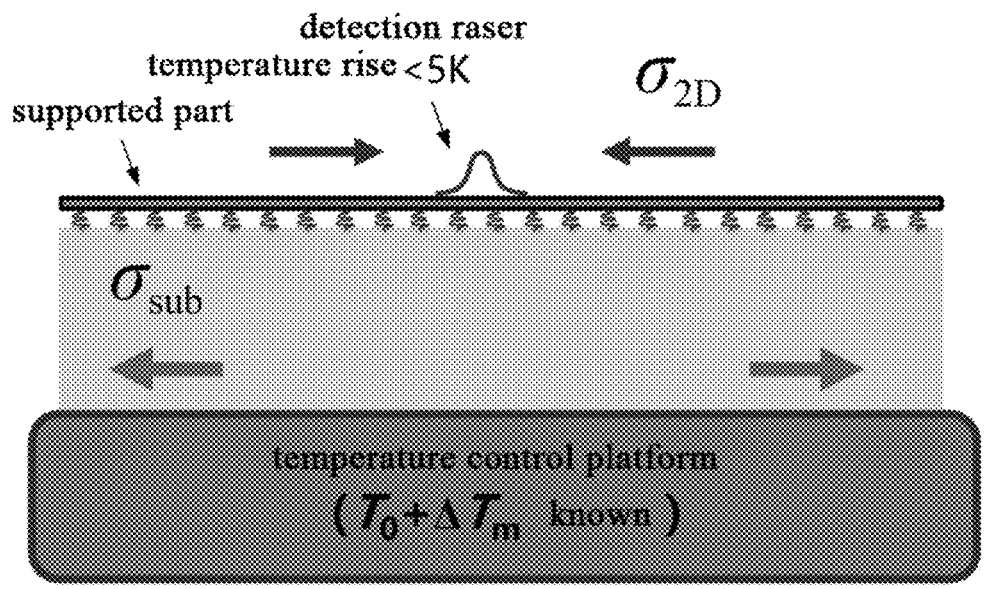
FIG. 3 is a schematic diagram showing a supported part of a two-dimensional film material heated by a temperature control platform according to an embodiment of the present disclosure.

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

The present disclosure is proposed by the inventors based on the following problems and findings. Errors may happen to the contact measurement methods due to the contact between the detector and the sample to be tested, which may affect the temperature/stress field of the sample itself. The non-contact measurement methods are only applied to metal materials or a coated sample, which cannot meet requirements of diversity and non-destructive of the nano-materials. Although the Raman spectroscopy method may be used to measure both the temperature and the stress of the material, the existing methods cannot distinguish the respective contributions of temperature and stress in the Raman shift signal. The temperature and stress of the material have to be measured separately. There is still a need to simultaneously measure the temperature and the thermal stress of a film material such as a nano-material.

With a lot of hard working, the inventors of the present disclosure have found that for the two-dimensional film material, based on the fact that a suspended part and a supported part of the two-dimensional film material have different stress states, decoupling the two parameters of the temperature and the thermal stress can be realized by recording different Raman signals generated by the same two-dimensional film material heated by a laser and a temperature control platform, establishing equations containing two independent variables of temperature and thermal stress coefficients, and solving the simultaneous equations. In this way, the contribution of the temperature to the Raman shift can be distinguished from the contribution of the thermal stress to the Raman shift. Further, a laser galvanometer or an electronic control platform may be used to perform a full-field scan of the Raman spectroscopy signal distribution of the two-dimensional film material. With such a full scan, in combination with the obtained temperature coefficient and thermal stress coefficient, the simultaneous in-situ measurement of the temperature field and thermal stress field of the two-dimensional film material can be realized.

In an aspect, the present disclosure provides embodiments a Raman spectroscopy method for simultaneously measuring a temperature and a thermal stress of a two-dimensional film material in situ. As shown in FIG. 1, the method includes: (1) providing the two-dimensional film material including a suspended part and a supported part having stress states different from each other, and measuring Raman spectroscopy signals of the suspended part and the supported part of the two-dimensional film material; (2) establishing equations of a Raman shift with temperature and a Raman shift with thermal stress for each of the suspended part and the supported part, and solving simultaneous equations to obtain coefficients of the Raman shift with temperature and the Raman shift with thermal stress for each of the suspended part and the supported part; and (3) scanning a characteristic Raman spectrum field of a surface of the two-dimensional film material and obtaining a temperature distribution and a thermal stress distribution of the two-dimensional film material according to the characteristic Raman spectrum field in combination of the coefficients of the Raman shift with temperature and the Raman shift with thermal stress.

It should be understood that the term "shift" refers to a frequency deviation of the Raman spectroscopy.

With the Raman spectroscopy method for simultaneously measuring the temperature and the thermal stress of the two-dimensional film material in situ according to the embodiments of the present disclosure, for two-dimensional film materials, the shifts of the characteristic peaks of the Raman spectroscopy can be measured in the suspended part and the supported part of the same sample respectively, and the decoupling of the temperature and the thermal stress can be realized by solving the equations of Raman shifts under conditions of different stress states of the suspended part and the supported part. Therefore, the simultaneous measurement of the temperature and the thermal stress of the two-dimensional film material in situ can be realized by establishing equations of a Raman shift with temperature and a Raman shift with thermal stress on the basis of the different stress states of the suspended part and the supported part. The present method may have high accuracy, high sensitivity and good repeatability without complicated mathematical calculation models and additional assumptions. Further, the present method is a non-destructive measurement method which may be realized in simple experimental principle and operation without complicated nano-material preparation process and complex micro-nano sensor processing technology, such as attaching thermocouple or stress radiography onto the two-dimensional film material. With the non-contact Raman spectroscopy method, the errors caused by the contact, which affects temperature and stress fields of the film material, in the contact measurement method may be avoided. The Raman spectroscopy method of the present disclosure is suitable for various types of two-dimensional film materials with characteristic Raman spectrum, and thus may be widely used in different applications. For example, the Raman spectroscopy method of the present disclosure may also be used for in-situ online evaluation of thermal failure of nano-semiconductor devices and improve thermal stability and service life of the devices.

The Raman spectroscopy method for simultaneously measuring the temperature and the thermal stress of a two-dimensional film material in situ will be described below in details with reference to FIGS. 1 to 3.

In step (1): the two-dimensional film material including a suspended part and a supported part is provided, in which the suspended part has a stress state different from that of the supported part, and Raman spectroscopy signals of the suspended part and the supported part of the two-dimensional film material are measured.

In an embodiment of the present disclosure, the Raman spectroscopy signal contains information of a Raman spectrogram and a frequency deviation of a characteristic Raman spectrum and the like.

In an embodiment of the present disclosure, the two-dimensional film material may have a thickness of no greater than 1 μm. It has been found that if the thickness of the two-dimensional film material is too large, the sensitivity for measuring the temperature and thermal stress of the material is low, which may affect the accuracy of measurement results. In the present disclosure, by controlling the thickness of the two-dimensional film material to be no greater than 1 μm, the sensitivity of the measurement can be significantly improved, resulting in better stability and accuracy of the measurement results. In an embodiment of the present disclosure, the two-dimensional film material may be a two-dimensional nano-material having a thinner thickness, a smaller heat capacity, and the sensitivity for measuring the temperature and the thermal stress may be higher, thus further improving the sensitivity and the accuracy of the measurement.

In an embodiment of the present disclosure, the step (1) may further include the following steps.

In step (1-1), the two-dimensional film material is placed onto a thermally conductive substrate with a plurality of holes to form the suspended part and the supported part. In a further embodiment, a single layer of the two-dimensional film material is transferred to the thermally conductive substrate. The two-dimensional film material of the present disclosure does not have a particularly limited type, as long as it has a characteristic Raman peak. For example, the two-dimensional film material may be a non-metallic material with a characteristic Raman peak, and thus a deviation of the peak may be used to measure the temperature and thermal stress changes of the film material sample.

In step (1-2), the thermally conductive substrate carried with the two-dimensional film material is placed onto a temperature control platform, and temperatures of the thermally conductive substrate and the two-dimensional film material are controlled by changing a temperature of the temperature control platform. The thermally conductive substrate is in direct contact with the temperature control platform, and the two-dimensional film material is in indirect contact with the temperature control platform. Since the two-dimensional film material is thin and the heat transfer speed is very fast, the temperature of the two-dimensional film material is the same as that of the thermally conductive substrate and the temperature control platform. On this basis, the temperature of the two-dimensional film material can be known by detecting the temperature of the thermally conductive substrate or the temperature control platform.

In step (1-3), as shown in FIG. 2, temperatures of the thermally conductive substrate and the two-dimensional film material are maintained at $T_0$ via the temperature control platform, a first laser beam is focused on a surface of the suspended part, and a characteristic Raman spectrum of the suspended part is measured. The intensity of the laser is gradually increased and shifts (i.e., frequency deviations) $\Delta\omega_{sus}$ under these different intensity conditions are recorded. A characteristic Raman spectrum includes Stoke and anti-Stoke peaks. Laser heating of the film material will produce an uneven temperature distribution, and the two-dimensional film material (lattice) will be deformed by the heat to produce a thermal stress $\sigma_{2D}$.

In step (1-4), a temperature rise equation of the two-dimensional film material is established according to frequencies of the Stoke and anti-Stoke peaks obtained in step (1-3), and a temperature rise of the two-dimensional film material generated at each of the different laser intensities is calculated. Further, after the two-dimensional film material is heated by the laser, the two-dimensional film material has an average temperature $T_m$ and an average temperature rise $\Delta T_m$, such that $T_m=T_0+\Delta T_m$, and $T_m$ is calculated via the following equation:

$$\frac{I_{AS}}{I_S} = \frac{(\omega_1+\omega_v)^4}{(\omega_1-\omega_v)^4}\exp\left(-\frac{h\omega_v}{k_B T_m}\right)$$

where $I_S$ represents an amplitude of the Stoke peak of the two-dimensional film material and $I_{AS}$ represents an amplitude of the anti-Stoke peak of the two-dimensional film material, $\omega_1$ represents a laser frequency, $\omega_v$ represents a frequency of a characteristic Raman peak, h represents the Planck constant, $k_B$ represents the Boltzmann constant, and $T_m$ represents an average temperature of the two-dimensional film material. Therefore, the average temperature rise $\Delta T_m$ of the two-dimensional film material due to the laser heating can be calculated according to the above equations.

In step (1-5), as shown in FIG. 3, a second laser beam is focused on a surface of the supported part of the two-dimensional film material and a temperature rise, generated by a laser, of the two-dimensional film material is controlled by a laser to be not greater than 5 K (to avoid the temperature rise of the two-dimensional film material caused by the laser intensity, and in a further embodiment, the temperature rise of the two-dimensional film material caused by the laser is not greater than 5% of the total temperature rise), the temperature of the thermally conductive substrate is increased via the temperature control platform. The temperature rise of the temperature control platform is $\Delta T_m$, such that the temperatures of the thermally conductive substrate and the two-dimensional film material can be precisely controlled at $T_0+\Delta T_m$. In other words, the temperature rise of the two-dimensional film material is controlled to be consistent with the temperature rise calculated in step (1-4). A shift $\Delta\omega_{sup}$ of a characteristic Raman spectrum of the two-dimensional film material at each of different temperatures of the thermally conductive substrate is measured and recorded. At this time, due to thermal expansion of the thermally conductive substrate, the thermally conductive substrate will generate a thermal stress $\sigma_{sub}$.

It should be noted that terms such as "temperature", "average temperature" and "temperature rise" of the two-dimensional film material in the present disclosure are based on an average surface Gaussian temperature of the two-dimensional film material sample.

In an embodiment of the present disclosure, in step (1-1), when the two-dimensional film material is a two-dimensional nano-material, a supporting film may be coated on a surface of the two-dimensional nano-material, and the two-dimensional nano-material is transferred onto the thermally conductive substrate with the plurality of holes by the supporting film, which is advantageous to transfer the two-dimensional nano-material, such as a single-layer two-dimensional nano-material, to the thermally conductive substrate. In an embodiment of the present disclosure, a spinner may be used to prepare a layer of polymer film on the surface of the single-layer two-dimensional nano-material prepared by chemical vapor deposition or mechanical peeling methods, and the polymer film can be used as the supporting material transferring the two-dimensional nano-material. It can be observed via a high power optical microscope that the two-dimensional nano-material is transferred onto a silicon substrate with the plurality of holes to form a two-dimensional nano-material sample partially including a suspended part and a supported part.

In an embodiment of the present disclosure, the type of the thermally conductive substrate in the present disclosure is not particularly limited, and those skilled in the art can make selections according to actual needs, for example, the thermally conductive substrate is at least one of a silicon substrate, a silicon dioxide substrate and a silicon carbide substrate.

In an embodiment of the present disclosure, in the step (1-5), a temperature control accuracy for the platform temperature $T_0+\Delta T_m$ may be ±0.1 K, thus improving the accuracy of measuring the temperature and thermal stress of the obtained two-dimensional film material sample.

In an embodiment of the present disclosure, in the step (1-5), the second laser beam focused on the surface of the supported part has an intensity of no greater than 3 mW, such that the two-dimensional film material sample will not have a too large temperature rise caused by the laser. Moreover, even for the two-dimensional nano-material, there will not be excessive temperature rise under the detection pulse laser having such an intensity range.

In an embodiment of the present disclosure, the first laser beam in the step (1-3) and the second laser beam in the step (1-5) are independently a monochromatic, stable, continuous laser beam. The laser used may be a gas laser or a solid laser. A total energy of the laser may be measured by a laser power meter, and an energy density distribution of the laser may be determined by scanning a carbon tube and observing an intensity distribution of the Raman peaks of the carbon tube.

In an embodiment of the present disclosure, suspended parts of the two-dimensional film material with different diameters can be prepared by designing a hole diameter of the thermally conductive substrate. In an embodiment, a ratio of a diameter of a spot formed on the surface of the two-dimensional film material by a laser beam to a diameter of a hole of the thermally conductive substrate is in a range of 3 to 10, such as 3, 4, 5, 6, 7, 8, 9, and 10, etc., alternatively in a range of 4 to 6. It has been found that, if the holes of the thermally conductive substrate are too small, the laser may irradiate an area corresponding to outside of a hole of the thermally conductive substrate during heating, and the measured Raman spectroscopy corresponds to the spot area, in this case, involving both the suspended part and the supported part, which does not fit the established equation described above. However, if the holes of the thermally conductive substrate are too large, there may be a relative large temperature gradient from the center to the periphery of the spot area, particularly when the heating is performed by a laser having a high intensity, resulting in damages to a two-dimensional film material sample, especially the two-dimensional nano-material sample, due to the excessive thermal stress. In the present disclosure, the ratio of the diameter of the spot formed by the laser beam to the diameter of the hole of the thermal conductive substrate is controlled within the above range, which may significantly improve the sensitivity and accuracy of the measurement results. It should be noted that the "spot" formed by the laser beam in the present disclosure refers to an optimized light spot.

In step (2), equations of a Raman shift with temperature and a Raman shift with thermal stress for each of the suspended part and the supported part are established, and the equations are combined and solved to obtain coefficients of the Raman shift with temperature and the Raman shift with thermal stress for each of the suspended part and the supported part.

In an embodiment of the present disclosure, as shown in FIG. 2, the laser beam is focused on the surface of the suspended part of the two-dimensional film material. The temperature of the film material is increased by the laser heating. According to the characteristics of the Raman shifts with the temperature and the stress, the following equation of the Raman shift of the suspended part of the two-dimensional film material is established.

$$\Delta\omega_{sus}=A_T\Delta T_m-A_S\sigma_{2D}$$

As shown in FIG. 3, the temperature control platform is used to change the temperature of the two-dimensional film material, and the detection laser is focused on the surface of the two-dimensional film material, and the energy of the detection laser is controlled to keep a temperature rise of the two-dimensional film material within 5 K. The following equation of the Raman shift of the supported part of the two-dimensional film material is established:

$$\Delta\omega_{sup}=A_T\Delta T_m-A_S\sigma_{2D}+A_S\int_{T_0}^{T_m}(E_{sub}\alpha_{sub}-E_{2D}\alpha_{2D})dT$$

where $\Delta\omega_{sus}$ represents a shift of a characteristic Raman spectrum of the suspended part, and $\Delta\omega_{sup}$ represents a shift of a characteristic Raman spectrum of the supported part; $A_T$ represents a shift coefficient with temperature, and $A_s$ represents a shift coefficient with thermal stress; $\sigma_{2D}$ represents a thermal stress of the two-dimensional film material; $\alpha_{sub}$ represents a thermal expansion coefficient of the thermally conductive substrate, and $\alpha_{2D}$ represents a thermal expansion coefficient of the two-dimensional film material; $E_{sub}$ represents an elastic modulus of the thermally conductive substrate, and $E_{2D}$ represents an elastic modulus of the two-dimensional film material; and $T_0$ represents a temperature of the thermally conductive substrate, $T_m$ represents an average temperature of the two-dimensional film material, and $\Delta T_m$ represents an average temperature rise of the two-dimensional film material.

It should be noted that, due to the small heat capacity of the two-dimensional film material, when a temperature control platform is used to heat the thermally conductive substrate and the supported part of the two-dimensional film material, the temperature of suspended part of the two-dimensional film material is the same with that of the supported part of the two-dimensional film material. The Raman shift of the suspended part of the two-dimensional film material is only related to the temperature and the thermal stress. However, the supported part of the two-dimensional film material is also in direct contact with the thermally conductive substrate. When the temperature rise and temperature of the supported part are the same to those of the suspended part, the Raman shift of the supported part of the two-dimensional film material is not only related to the temperature and the thermal stress, but also affected by the interface of the thermally conductive substrate. An effect of the thermally conductive substrate on the shift of the supported part of the two-dimensional film material may be expressed as the following formal.

$$A_S\int_{T_0}^{T_m}(E_{sub}\alpha_{sub}-E_{2D}\alpha_{2D})dT$$

Therefore, a temperature-dependent shift coefficient and a thermal stress-dependent shift coefficient of the two-dimensional film material can be obtained by combining the shift equations under two different stress conditions of the supported part and the suspended part of the two-dimensional film material.

The shift equation of the suspended part of the two-dimensional film material and the shift equation of the supported part of the two-dimensional film material are combined and solved, in which $\Delta\omega_{sus}$, $\Delta\omega_{sup}$ and $\Delta T_m$ may be measured through tests, the elastic modulus $E_{sub}$ and the thermal expansion coefficient $\alpha_{sub}$ of the thermally conductive substrate are known. The thermal stress is $\sigma_{sub}=E_{sub}\alpha_{sub}\Delta T_m$, and the lattice thermal stress of the two-dimensional film material is $\sigma_{2D}=E_{2D}\alpha_{2D}\Delta T_m$, where $E_{2D}$ represents an elastic modulus of the two-dimensional film material and $\sigma_{2D}$ represents a thermal stress of the two-dimensional film material, which may be obtained from databases, experiments in the literature or calculation results. The elastic modulus $E_{sub}$ and the thermal expansion coefficient $\sigma_{sub}$ of the thermally conductive substrate may also obtained from databases, experiments in the literature or calculation results. On this basis, the shift coefficient with thermal stress of the two-dimensional film material is calculated as below.

$$A_S = \frac{\Delta\omega_{sup} - \Delta\omega_{sus}}{\sigma_{sub} - \sigma_{2D}}$$

The shift coefficient with temperature of the two-dimensional film material is calculated as below.

$$A_T = \frac{\Delta\omega_{sus}\sigma_{sub} + \Delta\omega_{sup}\sigma_{2D} - 2\Delta\omega_{sus}\sigma_{2D}}{\Delta T_m(\sigma_{sub} - \sigma_{2D})}$$

In step (3), a characteristic Raman spectrum field of a surface of the two-dimensional film material is scanned and a temperature distribution and a thermal stress distribution of the two-dimensional film material is obtained according to the characteristic Raman spectrum field in combination of the coefficients of the Raman shift with temperature and the Raman shift with thermal stress.

In an embodiment of the present disclosure, the step (3) may further include the following steps.

In step (3-1), a focus position of a laser beam or a position of the two-dimensional film material is controlled, every point in a two-dimensional plane of the two-dimensional film material is scanned, and every shift of the characteristic Raman spectrum of the two-dimensional film material including the suspended part and the supported part is recorded. For example, a laser galvanometer or a precise electronic control platform may be used to control the focus position of the detection laser or the position of the sample, and to automatically scan the characteristic Raman spectrum of each point of the two-dimensional film material in a two-dimensional plane, to obtain Raman signals of the full field of the two-dimensional film material to be tested.

In step (3-2), temperature rise and thermal stress equations of the suspended part and temperature rise and thermal stress equations of the supported part are established according to the shift coefficient with thermal stress and the shift coefficient with temperature calculated from the step (2).

In an embodiment, the suspended part has the following temperature rise equation and thermal stress equation.

$$\Delta T_m = \Delta\omega_{sus}/(A_T - A_S E_{2D}\alpha_{2D})$$

$$\sigma_{2D} = E_{2D}\alpha_{2D}\Delta T_m$$

In an embodiment, the supported part has the following temperature rise equation and thermal stress equation.

$$\Delta T_m = (\Delta\omega_{sup} - A_S\sigma_{sub})/(A_T - 2A_S E_{2D}\alpha_{2D})$$

$$\sigma_{2D} = E_{2D}\alpha_{2D}\Delta T_m$$

In step (3-3), temperature field and thermal stress field distributions of the suspended part and the supported part of the two-dimensional film material are calculated according to the shifts of the characteristic Raman spectrum of every point in the two-dimensional plane of the two-dimensional film material and the equations established in the step (3-2). Therefore, the temperature and thermal stress distributions of the two-dimensional film material can be obtained according to the Raman shift of the characteristic Raman spectrum of the two-dimensional film material.

It should be noted that in the present disclosure, the parameters represented by the same symbols have the same meaning.

In an embodiment of the present disclosure, the Raman spectroscopy method for simultaneously measuring a temperature and a thermal stress of a two-dimensional film material in situ of the present disclosure can be performed in a vacuum or atmospheric environment. An high accuracy in-situ measurement of the temperature field and the thermal stress field of the two-dimensional film material can be realized by utilizing the two different stress states of the suspended part and the supported part of the two two-dimensional film material to establish the equations of the Raman shift with the temperature and the thermal stress, respectively, combining and solving the equations to obtain the shift coefficient with temperature and the shift coefficient with thermal stress of the two-dimensional film material, and further using the laser space automatic scanning technology.

In an embodiment of the present disclosure, the Raman spectroscopy method for simultaneously measuring the temperature and the thermal stress of the two-dimensional film material in situ of the present disclosure is used to measure, on line, a characteristic Raman spectrum of a two-dimensional film material or a two-dimensional nano-material semiconductor device, which is powered on, to obtain in-situ distributions of the temperature and the thermal stress of the material.

In summary, with the Raman spectroscopy method for simultaneously measuring the temperature and the thermal stress of the two-dimensional film material in situ according to the above embodiments of the present disclosure, a temperature field and a thermal stress field of a sample to be tested can be obtained by utilizing two different stress states of a suspended part and a supported part of the sample to establish the equations of Raman shift with the temperature and the thermal stress, combining and solving the equations to obtain shift coefficient with temperature and shift coefficient with thermal stress of the sample, scanning Raman signals of every point of the sample, and determining a temperature distribution and a thermal stress distribution of the sample according to the Raman signals in combination of the coefficients of the Raman shift with temperature and the Raman shift with thermal stress. Compared with the related art, the present method is simple in principle and operation, and can realize non-contact and non-destructive detection of temperature and thermal stress without complicated mathematical calculation models and additional assumptions. Moreover, the present method does not require the preparation of a sensor or a metal film on the surface of the sample to be tested, thus avoiding influences of the detector or the metal film on temperature field and thermal stress field of the sample, which significantly improves the reliability and accuracy of the measurement results. In addition, the method realizes the decoupling of temperature and stress of the Raman signal, and is suitable for various types of two-dimensional film materials with characteristic Raman spectrum, and thus may be widely used in different applications, such as in-situ evaluation of thermal failure of a nano-semiconductor device, thermal analysis and thermal design of a nano-electronic device.

Figure 7:
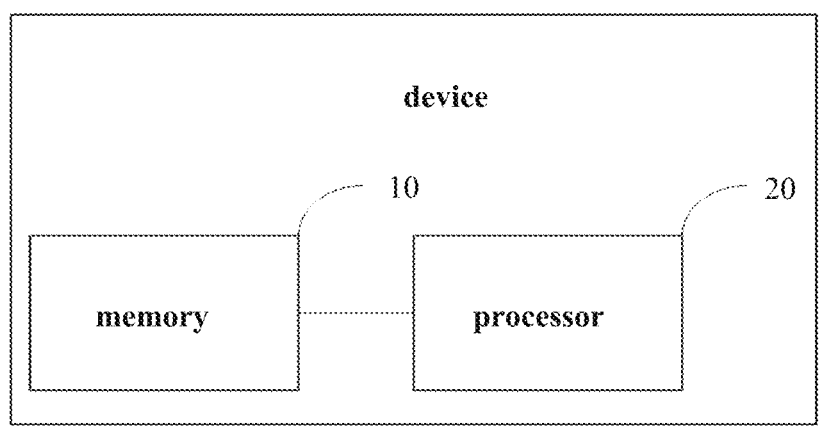
FIG. 7 is a block diagram of a device for simultaneously measuring a temperature and a thermal stress of a two-dimensional film material in situ according to an embodiment of the present disclosure.

In addition, as shown in FIG. 7, in an embodiment of the present disclosure a device for simultaneously measuring a temperature and a thermal stress of a two-dimensional film material in situ, including: a processor 20; and a memory 10 for storing instructions executable by the processor 20. The processor 20 is configured to perform the Raman spectroscopy method as described above.

In a further embodiment, the present disclosure provides a non-transitory computer readable storage medium having stored therein a computer program that, when executed by a processor, causes the processor to perform the Raman spectroscopy method as described above.

The details disclosed in the embodiments of the Raman spectroscopy method as described above are applicable to the device and the non-transitory computer readable storage medium, and thus are not described here again.

The present disclosure will be described in details with examples. Those skilled in the art will understand that the following examples are only used to illustrate the present disclosure and shall not be construed to limit the present disclosure. Technology or condition that is not described in details in the examples may be performed as described in literature documents in the art or product specifications. An instrument used without indicating a manufacturer is a conventional product that is commercially available.

EXAMPLE 1

Figure 4:
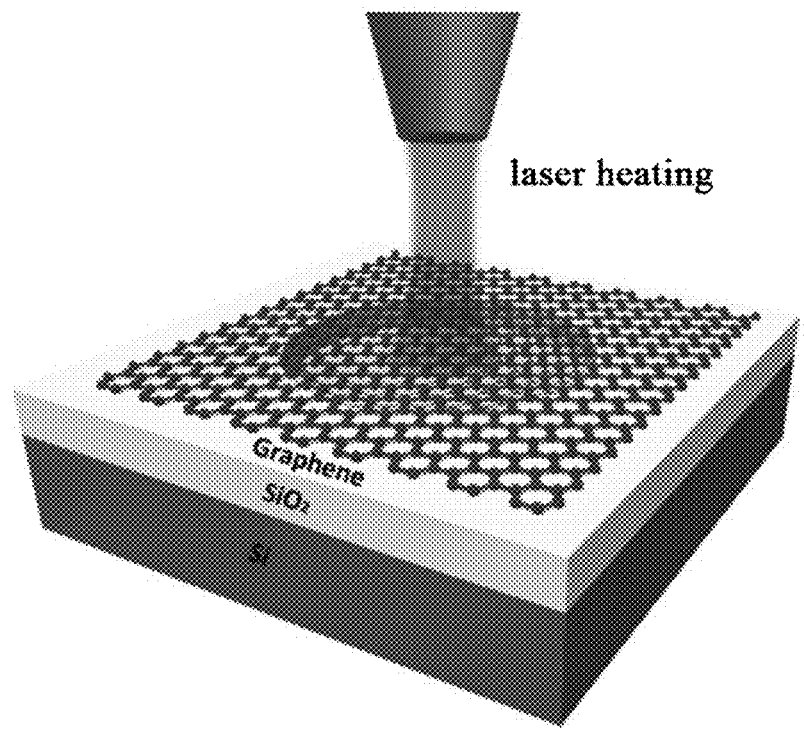
FIG. 4 is a schematic diagram showing a suspended part of single-layer graphene heated by a laser according to an embodiment of the present disclosure.
Figure 5:
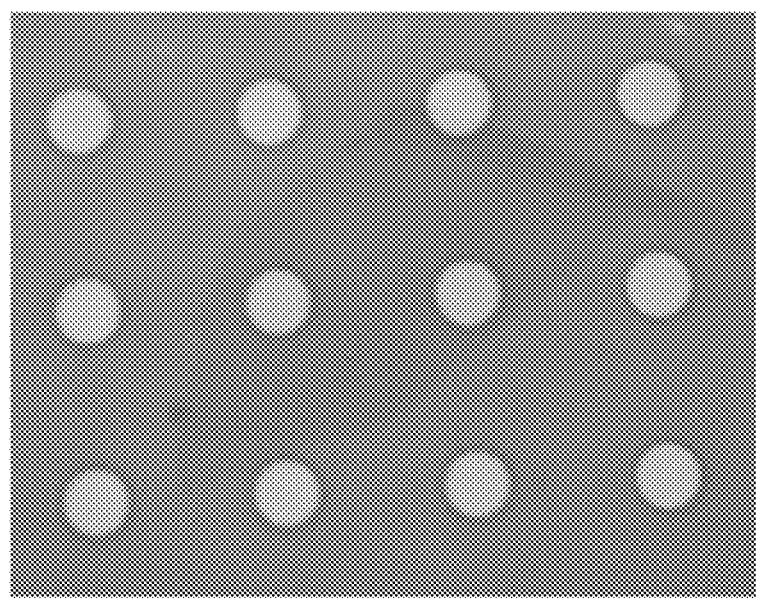
FIG. 5 is a microscope photograph of a single-layer graphene sample including a suspended part and a supported part according to an embodiment of the present disclosure.

Determination of temperature and thermal stress of a single-layer graphene under laser heating A schematic diagram of an experimental configuration for measuring temperature and thermal stress of graphene is shown in FIG. 4. A mechanically peeled single-layer graphene was transferred onto the silicon substrate with a plurality of holes via a polymer film transferring method to form a two-dimensional nano-material sample including a suspended part and a supported part. The prepared single-layer graphene sample is shown in FIG. 5. A laser beam was focused on suspended part of graphene, and in this case Raman spectrum signals were detected and collected by a confocal micro-Raman spectrometer. A local temperature of graphene was increased by laser heating and an uneven temperature distribution was generated to cause a thermal stress of the material, resulting in a deviation of a characteristic Raman peak.

The Raman spectrum signals of the suspended part and the supported part of graphene were measured separately. During measuring of the suspended part of graphene, the temperature of the temperature control platform was kept at $T_0$, and the laser heating power was gradually increased, such that the characteristic Raman peak shifts of the suspended part of graphene at different laser heating power conditions were obtained. An average temperature $T_m$ of graphene was calculated according to a ratio of an intensity of Stoke peak to an intensity of anti-Stoke peak with the following equation:

$$\frac{I_{AS}}{I_S} = \frac{(\omega_1 + \omega_v)^4}{(\omega_1 - \omega_v)^4} \exp\left(-\frac{h\omega_v}{k_B T_m}\right)$$

where $I_S$ represents an amplitude of the Stoke peak of graphene and $I_{AS}$ represents an amplitude of the anti-Stoke peak of graphene, $\omega_1$ represents a laser frequency, $\omega_v$ represents a frequency of a characteristic Raman peak, h represents the Planck constant, $k_B$ represents the Boltzmann constant, and $T_m$ represents the average temperature of graphene.

An equation of the Raman shift of the suspended part of graphene is established as below:

$$\Delta\omega_{sus} = A_T \Delta T_m - A_S \sigma_{2D}$$

where $A_T$ represents a shift coefficient with temperature, and $A_s$ represents a shift coefficient with thermal stress, $\sigma_{2D}$ represents a thermal stress of graphene, $\Delta\omega_{sus}$ represents a shift of a characteristic Raman spectrum of the suspended part of graphene, and $\Delta T_m$ represents an average temperature rise of graphene.

During the measuring of the supported part of graphene, the temperature of the temperature control platform was increased to $T_0 + \Delta T_m$, the Raman characteristic peak shifts of the supported part of graphene at different substrate temperature conditions were measured. On this basis, a control equation is established as below:

$$\Delta\omega_{sup} = A_T \Delta T_m - A_S \sigma_{2D} + A_S \int_{T_0}^{T_m} (E_{sub}\alpha_{sub} - E_{2D}\alpha_{2D})dT$$

where $T_0$ represents a temperature of the silicon substrate, $\alpha_{sub}$ represents a thermal expansion coefficient of the silicon substrate, and $\alpha_{2D}$ represents a thermal expansion coefficient of graphene, $E_{sub}$ represents an elastic modulus of the silicon substrate, and $E_{2D}$ represents an elastic modulus of graphene, and $\Delta\omega_{sup}$ represents a shift of a characteristic Raman spectrum of the supported part of graphene.

Figure 6:
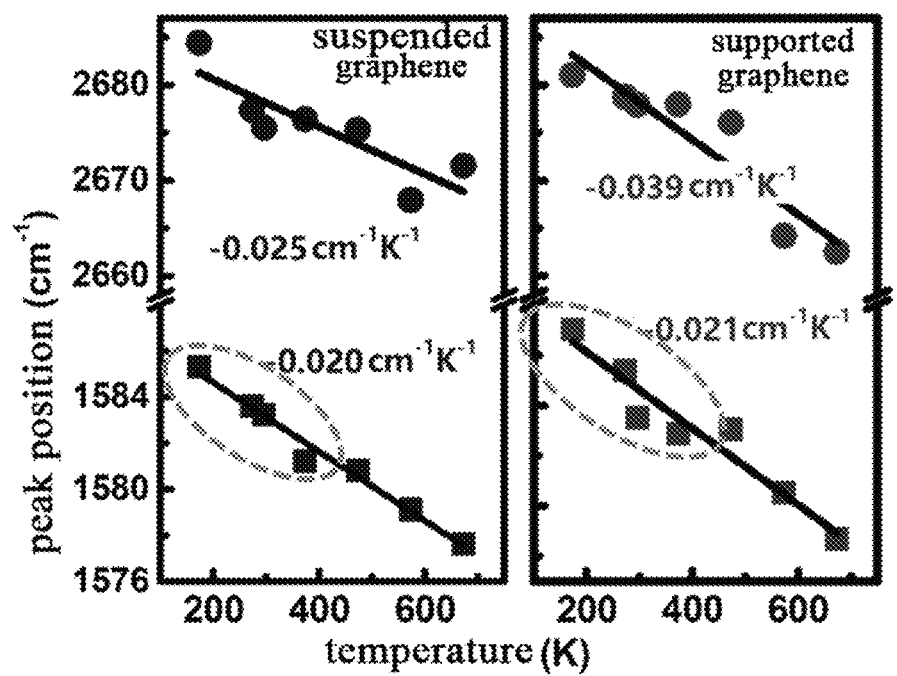
FIG. 6 is a graph showing results of changes of Raman shift with temperature of suspended part and the supported part of the according to an embodiment of the present disclosure.

In this example, the results of the measured G peak and 2D peak shifts with temperature of the suspended part and the supported part of graphene are shown in FIG. 6. the suspended part of graphene has a shift slope of the G peak of $-0.020$ cm$^{-1}$K$^{-1}$ and a shift slope of the 2D peak of $-0.025$ cm$^{-1}$K$^{-1}$, and the supported part of graphene has a shift slope of the G peak of $-0.021$ cm$^{-1}$K$^{-1}$ and a shift slope of the 2D peak of $-0.039$ cm$^{-1}$K$^{-1}$. The shift slopes of the G peak and the 2D peak of the suspended part are smaller than those of the supported part, respectively, and thus this result conforms to the theoretical model analysis result.

The above Raman shift control equations of the suspended part and the supported part of graphene are combined and simultaneously solved to simultaneously obtain the temperature coefficient and the stress coefficient that affect the Raman shift as follows:

$$A_S = \frac{\Delta\omega_{sup} - \Delta\omega_{sus}}{\sigma_{sub} - \sigma_{2D}}$$

$$A_T = \frac{\Delta\omega_{sus}\sigma_{sub} + \Delta\omega_{sup}\sigma_{2D} - 2\Delta\omega_{sus}\sigma_{2D}}{\Delta T_m(\sigma_{sub} - \sigma_{2D})}$$

where $\Delta\omega_{sus}$, $\Delta\omega_{sup}$ and $\Delta T_m$ may be measured through tests, the elastic modulus $E_{sub}$ and the thermal expansion coefficient $\alpha_{sub}$ of the silicon substrate are known. The thermal stress is $\sigma_{sub} = E_{sub}\alpha_{sub}\Delta T_m$, and the lattice thermal stress of graphene is $\sigma_{2D} = E_{2D}\alpha_{2D}\Delta T_m$, where $E_{2D}$ represents an elastic modulus of graphene and $\sigma_{2D}$ represents a thermal stress of graphene, which are known from experiments and calculation results in literatures.

A laser galvanometer and an electronic control platform were used to measure the full-field Raman spectrum signals of graphene. On the basis of the obtained temperature and stress coefficients, the temperature and thermal stress distributions of the suspended part of graphene sample can be calculated by using the following equations.

$$\Delta T_m \Delta \omega_{sus}/(A_T - A_S E_{2D} \alpha_{2D})$$

$$\sigma_{2D} = E_{2D} \alpha_{2D} \Delta T_m$$

The temperature and thermal stress distributions of the supported part of graphene sample can be calculated by using the following equations.

$$\Delta T_m = (\Delta \omega_{sup} - A_S \sigma_{sub})/(A_T - 2A_S E_{2D} \alpha_{2D})$$

$$\sigma_{2D} = E_{2D} \alpha_{2D} \Delta T_m$$

According to the above equations, the thermal stress of the single-layer graphene, which is caused by the thermal deformation in lattice, at a temperature rise of 200 K is 80 MPa.

The present disclosure is not limited to the above specific embodiments. The Raman spectroscopy method for simultaneously measuring a temperature and a thermal stress of a two-dimensional film material in situ of the present disclosure can be widely used in different applications, and the method of the present disclosure can be adopted to different specific applications. For example, based on the decoupling principle of temperature and thermal stress in the Raman spectrum signal of nano-materials described in the present disclosure, the temperature and thermal stress distributions of different two-dimensional materials can be measured simultaneously, and other properties such as a thermal expansion coefficient, an elastic modulus, a thermal deformation and a thermal stress of a nano-interface of the material may be further calculated according to the temperature and the thermal stress of the nano-material obtained from the in-situ measurement.

In the specification, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, unless specified otherwise, "a plurality of" means two or more than two.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the description, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification, as well as features of embodiments or examples, without conflicting, may be combined by one skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A Raman spectroscopy method for simultaneously measuring a temperature and a thermal stress of a two-dimensional film material in situ, comprising:
   (1) providing the two-dimensional film material comprising a suspended part and a supported part having stress states different from each other, and measuring Raman spectroscopy signals of the suspended part and the supported part of the two-dimensional film material;
   (2) establishing equations of a Raman shift with temperature and a Raman shift with thermal stress for each of the suspended part and the supported part, and solving simultaneous equations to obtain coefficients of the Raman shift with temperature and the Raman shift with thermal stress for each of the suspended part and the supported part; and
   (3) scanning a characteristic Raman spectrum field of a surface of the two-dimensional film material and obtaining a temperature distribution and a thermal stress distribution of the two-dimensional film material according to the characteristic Raman spectrum field in combination of the coefficients of the Raman shift with temperature and the Raman shift with thermal stress.

2. The Raman spectroscopy method according to claim 1, wherein the two-dimensional film material is a non-metallic material having a Raman characteristic peak.

3. The Raman spectroscopy method according to claim 1, wherein the two-dimensional film material has a thickness of no more than 1 μm.

4. The Raman spectroscopy method according to claim 1, wherein the two-dimensional film material is a two-dimensional nano-material.

5. The Raman spectroscopy method according to claim 1, wherein the step (1) further comprises:
   (1-1) placing the two-dimensional film material onto a thermally conductive substrate with a plurality of holes to form the suspended part and the supported part;
   (1-2) placing the thermally conductive substrate carried with the two-dimensional film material onto a temperature control platform, and controlling temperatures of the thermally conductive substrate and the two-dimensional film material by changing a temperature of the temperature control platform;

(1-3) maintaining temperatures of the thermally conductive substrate and the two-dimensional film material unchanged via the temperature control platform, focusing a first laser beam on a surface of the suspended part, and measuring a characteristic Raman spectrum of the suspended part and recording a shift of a characteristic Raman spectrum comprising Stoke and anti-Stoke peaks at each of different laser intensities;

(1-4) establishing a temperature rise equation of the two-dimensional film material according to frequencies of the Stoke and anti-Stoke peaks obtained in step (1-3), and calculating a temperature rise of the two-dimensional film material generated at each of the different laser intensities;

(1-5) focusing a second laser beam on a surface of the supported part of the two-dimensional film material and controlling a temperature rise, generated by a laser, of the two-dimensional film material to be not greater than 5 K, increasing the temperature of the thermally conductive substrate via the temperature control platform so as to control the temperature rise of the two-dimensional film material to be consistent with the temperature rise calculated in step (1-4), and measuring and recording a shift of a characteristic Raman spectrum of the two-dimensional film material at each of different temperatures of the thermally conductive substrate.

6. The Raman spectroscopy method according to claim 5, wherein in the step (1-4), after the two-dimensional film material is heated by the laser, the two-dimensional film material meets the following temperature equation:

$$\frac{I_{AS}}{I_S} = \frac{(\omega_1+\omega_v)^4}{(\omega_1-\omega_v)^4}\exp\left(-\frac{\hbar\omega_v}{k_B T_m}\right)$$

where $I_S$ represents an amplitude of the Stoke peak of the two-dimensional film material and $I_{AS}$ represents an amplitude of the anti-Stoke peak of the two-dimensional film material, $\omega_1$ represents a laser frequency, $\omega_v$ represents a frequency of a characteristic Raman peak, h represents the Planck constant, $k_B$ represents the Boltzmann constant, and $T_m$ represents an average temperature of the two-dimensional film material.

7. The Raman spectroscopy method according to claim 5, wherein the step (2) further comprises:

establishing the following equation of the Raman shift of the suspended part obtained from the step (1-3):

$$\Delta\omega_{sus}=A_T\Delta T_m - A_S\sigma_{2D}$$

establishing the following equation of the Raman shift of the supported part obtained from the step (1-5):

$$\Delta\omega_{sup}=A_T\Delta T_m - A_S\sigma_{2D} + A_S\int_{T_0}^{T_m}(E_{sub}\alpha_{sub}-E_{2D}\alpha_{2D})dT$$

where $\Delta\omega_{sus}$ represents a shift of a characteristic Raman spectrum of the suspended part, and $\Delta\omega_{sup}$ represents a shift of a characteristic Raman spectrum of the supported part;

$A_T$ represents a shift coefficient with temperature, and $A_s$ represents a shift coefficient with thermal stress;

$\sigma_{2D}$ represents a thermal stress of the two-dimensional film material;

$\alpha_{sub}$ represents a thermal expansion coefficient of the thermally conductive substrate, and $\alpha_{2D}$ represents a thermal expansion coefficient of the two-dimensional film material;

$E_{sub}$ represents an elastic modulus of the thermally conductive substrate, and $E_{2D}$ represents an elastic modulus of the two-dimensional film material; and $T_0$ represents a temperature of the thermally conductive substrate, $T_m$ represents an average temperature of the two-dimensional film material, and $\Delta T_m$ represents an average temperature rise of the two-dimensional film material.

8. The Raman spectroscopy method according to claim 7, wherein the shift coefficient with thermal stress of the two-dimensional film material is calculated as $$A_S = \frac{\Delta\omega_{sup} - \Delta\omega_{sus}}{\sigma_{sub} - \sigma_{2D}},$$

the shift coefficient with temperature of the two-dimensional film material is calculated as $$A_T = \frac{\Delta\omega_{sus}\sigma_{sub} + \Delta\omega_{sup}\sigma_{2D} - 2\Delta\omega_{sus}\sigma_{2D}}{\Delta T_m(\sigma_{sub}-\sigma_{2D})},$$

the thermal stress of the two-dimensional film material is calculated as $\sigma_{2D}E_{2D}\alpha_{2D}\Delta T_m$, and the thermal stress of the thermally conductive substrate is calculated as $\sigma_{sub}=E_{sub}\alpha_{sub}\Delta T_m$.

9. The Raman spectroscopy method according to claim 1, wherein the step (3) further comprises:

(3-1) controlling a focus position of a laser beam or a position of the two-dimensional film material, scanning every point in a two-dimensional plane of the two-dimensional film material, and recording every shift of the characteristic Raman spectrum of the two-dimensional film material comprising the suspended part and the supported part;

(3-2) establishing temperature rise and thermal stress equations of the suspended part and the supported part according to the shift coefficient with thermal stress and the shift coefficient with temperature; and (3-3) calculating temperature field and thermal stress field distributions of the suspended part and the supported part of the two-dimensional film material according to the shifts of the characteristic Raman spectrum of every point in the two-dimensional plane of the two-dimensional film material and the equations established in the step (3-2).

10. The Raman spectroscopy method according to claim 9, wherein in the step (3-2), the suspended part has the following temperature rise equation of $$\Delta T_m = \Delta\omega_{sus}/(A_T - A_S E_{2D}\alpha_{2D}), \text{ and}$$

the following thermal stress equation of $$\sigma_{2D}=E_{2D}\alpha_{2D}\Delta T_m,$$

and the supported part has the following temperature rise equation of $$\Delta T_m = (\Delta\omega_{sup} - A_S\sigma_{sub})/(A_T - 2A_S E_{2D}\alpha_{2D}), \text{ and}$$

the following thermal stress equation of $$\sigma_{2D}=E_{2D}\alpha_{2D}\Delta T_m.$$

11. The Raman spectroscopy method according to claim 5, wherein in the step (1-1), the two-dimensional film material is a two-dimensional nano-material coated with a supporting film, and the two-dimensional nano-material is transferred onto the thermally conductive substrate with the plurality of holes by the supporting film.

12. The Raman spectroscopy method according to claim 5, wherein in the step (1-1), the thermally conductive substrate is at least one of a silicon substrate, a silicon dioxide substrate and a silicon carbide substrate.

13. The Raman spectroscopy method according to claim 5, wherein the first laser beam and the second laser beam are independently a monochromatic, stable, continuous laser beam.

14. The Raman spectroscopy method according to claim 5, wherein the second laser beam focused on the surface of the supported part has an intensity of no greater than 3 mW.

15. The Raman spectroscopy method according to claim 5, wherein a ratio of a diameter of a spot formed on the surface of the two-dimensional film material by a laser beam to a diameter of a hole of the thermally conductive substrate is in a range of 3 to 10.

16. The Raman spectroscopy method according to claim 15, wherein the ratio of the diameter of the spot formed on the surface of the two-dimensional film material to the diameter of the hole of the thermally conductive substrate is in a range of 4 to 6.

17. A device for simultaneously measuring a temperature and a thermal stress of a two-dimensional film material in situ, comprising:
   a processor; and
   a memory for storing instructions executable by the processor;
   wherein the processor is configured to perform a Raman spectroscopy method for simultaneously measuring a temperature and a thermal stress of a two-dimensional film material in situ, the method comprising:
   (1) providing the two-dimensional film material comprising a suspended part and a supported part having stress states different from each other, and measuring Raman spectroscopy signals of the suspended part and the supported part of the two-dimensional film material;
   (2) establishing equations of a Raman shift with temperature and a Raman shift with thermal stress for each of the suspended part and the supported part, and solving simultaneous equations to obtain coefficients of the Raman shift with temperature and the Raman shift with thermal stress for each of the suspended part and the supported part; and
   (3) scanning a characteristic Raman spectrum field of a surface of the two-dimensional film material and obtaining a temperature distribution and a thermal stress distribution of the two-dimensional film material according to the characteristic Raman spectrum field in combination of the coefficients of the Raman shift with temperature and the Raman shift with thermal stress.

18. A non-transitory computer readable storage medium having stored therein a computer program that, when executed by a processor, causes the processor to perform a Raman spectroscopy method for simultaneously measuring a temperature and a thermal stress of a two-dimensional film material in situ, the method comprising:
   (1) providing the two-dimensional film material comprising a suspended part and a supported part having stress states different from each other, and measuring Raman spectroscopy signals of the suspended part and the supported part of the two-dimensional film material;
   (2) establishing equations of a Raman shift with temperature and a Raman shift with thermal stress for each of the suspended part and the supported part, and solving simultaneous equations to obtain coefficients of the Raman shift with temperature and the Raman shift with thermal stress for each of the suspended part and the supported part; and
   (3) scanning a characteristic Raman spectrum field of a surface of the two-dimensional film material and obtaining a temperature distribution and a thermal stress distribution of the two-dimensional film material according to the characteristic Raman spectrum field in combination of the coefficients of the Raman shift with temperature and the Raman shift with thermal stress.

\* \* \* \* \*